US012672023B2

(12) United States Patent
Miura et al.

(10) Patent No.: US 12,672,023 B2
(45) Date of Patent: Jun. 30, 2026

(54) COMMUNICATION DEVICE, COMMUNICATION SYSTEM EQUIPPED WITH THE SAME, COMMUNICATION METHOD, AND COMMUNICATION PROGRAM

(71) Applicant: OMRON CORPORATION, Kyoto (JP)

(72) Inventors: Takashi Miura, Kyoto (JP); Hideki Chujo, Kyoto (JP); Hideaki Kojima, Kyoto (JP); Toshiyasu Miwata, Kyoto (JP); Hiroyuki Mino, Kyoto (JP); Masahiro Itoh, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 316 days.

(21) Appl. No.: 18/527,989

(22) Filed: Dec. 4, 2023

(65) Prior Publication Data

US 2024/0196260 A1      Jun. 13, 2024

(30) Foreign Application Priority Data

Dec. 8, 2022      (JP) ................................. 2022-196123

(51) Int. Cl.
*H04W 28/02*          (2009.01)
*H04B 17/318*         (2015.01)

(52) U.S. Cl.
CPC ...... *H04W 28/0236* (2013.01); *H04B 17/318* (2015.01)

(58) Field of Classification Search
CPC ......................... H04W 28/0236; H04B 17/318

USPC ......................................................... 370/252
See application file for complete search history.

(56) References Cited

U.S. PATENT DOCUMENTS

| | | | |
|---|---|---|---|
| 10,470,138 B2 * | 11/2019 | Kwon ................. | H04W 52/246 |
| 2007/0030156 A1 * | 2/2007 | Schlager ............ | G08B 21/0288 |
| | | | 340/573.1 |
| 2015/0111598 A1 * | 4/2015 | Azami ................ | G01S 5/02521 |
| | | | 455/456.1 |
| 2017/0105217 A1 * | 4/2017 | Kwon ................. | H04W 52/245 |
| 2022/0141772 A1 * | 5/2022 | Muehlmann ............. | H04B 5/26 |
| | | | 370/318 |
| 2022/0261608 A1 * | 8/2022 | Qi .......................... | G01S 7/414 |
| 2022/0353688 A1 * | 11/2022 | Shuman .............. | H04W 12/122 |

(Continued)

FOREIGN PATENT DOCUMENTS

JP          2022-117261 A        8/2022

*Primary Examiner* — Marnie A Matt
(74) *Attorney, Agent, or Firm* — METROLEX IP LAW GROUP, PLLC; Robert L. Scott, Esq.

(57) ABSTRACT

A communication device 10 comprises a control unit 11*b*, a first communication unit 11, a second communication unit 12, and a communication control unit 11*da*. The control unit 11*b* acquires output signals from sensors 21*a* to 21*d*. The first communication unit 11 and the second communication unit 12 transmit the output signals acquired by the control unit 11*b* to a cloud server 31. The communication control unit 11*da* uses the first communication unit 11 to communicate with the cloud server 31 when the radio field strength of the signal transmitted from the first communication unit 11 to the cloud server 31 is over a specific threshold value, and switches from communication using the first communication unit 11 to communication using the second communication unit 12 when the radio field strength is at or below the specific threshold value.

13 Claims, 7 Drawing Sheets

(56)         References Cited

U.S. PATENT DOCUMENTS

2023/0007560 A1 *    1/2023   Aoki ..................... H04W 76/25
2024/0430769 A1 *   12/2024   Shirai ................... H04W 24/08

* cited by examiner

| TYPE OF RADIO FIELD STRENGTH | RSSI (Received Signal Strength Indicator) | RSRP(Reference Signal Received Power) |
|---|---|---|
| UNIT | dBm | dBm |
| DEFINITION | A POWER MEASUREMENT VALUE OF THE SIGNAL (ENTIRE SYSTEM BAND) FROM AN ACCESS POINT (BASE STATION) OR ROUTER | A RECEIVED POWER VALUE OF A REFERENCE SIGNAL DETERMINED BY THE POSITIONAL RELATION BETWEEN A TERMINAL AND A BASE STATION |

FIG. 2

| TIME | SENSOR TYPE | ID (FOR MULTIPLE CONNECTION DETERMINATION) | SENSOR DATA |
|---|---|---|---|
| 2022/01/01 00:00:00 | TEMPERATURE | 1 | 20.0°C |
| 2022/01/01 00:00:00 | TEMPERATURE | 2 | 21.3°C |
| 2022/01/01 00:00:00 | ATMOSPHERIC PRESSURE | 1 | 1011hPa |
| 2022/01/01 00:01:00 | TEMPERATURE | 1 | 20.1°C |
| 2022/01/01 00:01:00 | TEMPERATURE | 2 | 21.4°C |
| 2022/01/01 00:01:00 | ATMOSPHERIC PRESSURE | 1 | 1012hPa |
| : | : | : | : |

FIG. 3

| TIME | RSSI | RSRP |
|---|---|---|
| 2022/01/01 00:00:00 | -80dB | -101dBm |
| 2022/01/01 00:01:00 | -81dB | -102dBm |
| 2022/01/01 00:02:00 | -80dB | -101dBm |
| 2022/01/01 00:03:00 | -81dB | -102dBm |
| 2022/01/01 00:04:00 | -83dB | -105dBm |
| 2022/01/01 00:05:00 | -81dB | -102dBm |
| ·· | ·· | ·· |

FIG. 4

| COMMUNICATION METHOD | THRESHOLD VALUE SETTING CATEGORY | VALUE |
|---|---|---|
| LTE-Cat1 | RSRP | -120dBm |
| | TIMEOUT DURATION | 150 SECONDS |
| LTE-CatM1 | RSRP | -120dBm |
| | TIMEOUT DURATION | 150 SECONDS |
| LoRa | RSSI | -90dB |
| | TIMEOUT DURATION | 60 SECONDS |
| Wi-Fi | RSSI | -90dB |
| | TIMEOUT DURATION | 60 SECONDS |
| BLE | RSSI | -90dB |
| | TIMEOUT DURATION | 60 SECONDS |
| : | : | : |

FIG. 5

COMMUNICATION DEVICE, COMMUNICATION SYSTEM EQUIPPED WITH THE SAME, COMMUNICATION METHOD, AND COMMUNICATION PROGRAM

CROSS-REFERENCE TO RELATED APPLICATIONS

This application claims priority to Japanese Patent Application No. 2022-196123 filed on Dec. 8, 2022. The entire disclosure of Japanese Patent Application No. 2022-196123 is hereby incorporated herein by reference.

BACKGROUND

Technical Field

The present invention relates to a communication device that acquires output signals from an external device and outputs these to an external server, as well as a communication system equipped with this communication device, a communication method, and a communication program.

Description of the Related Art

Communication devices that transmit output from sensors or other such external devices to management servers or the like have been used in recent years.

For example, Patent Literature 1 discloses an IoT system and a management server comprising a plurality of node terminals each having a wireless communication module and a sensor, and a management server, in which sensor information is transmitted through the wireless communication module to the management server, the management server receives sensor information and determines whether or not notification is necessary on the basis of the sensor information, and a message is posted to a chat room if notification is necessary.

CITATION LIST

Patent Literature

Patent Literature 1: JP-A 2022-117261

SUMMARY

Problem to be Solved by the Invention

However, the following problem is encountered with the conventional IoT system described above.

With the IoT system disclosed in the above publication, there is only one communication means for transmitting data to a cloud server. This means that if this one communication means should be unable to communicate due to deterioration of the communication environment or the like, there is the risk that data cannot be transmitted to the cloud server.

It is an object of the present invention to provide a communication device with which output signals acquired from an external device can be stably outputted to an external server, as well as a communication system equipped with this communication device, a communication method, and a communication program.

Means for Solving Problem

The communication device according to the first invention is a communication device that acquires an output signal from an external device and transmits it to an external server, the communication device comprising a signal acquisition unit, a first communication unit and a second communication unit, and a first communication control unit. The signal acquisition unit acquires an output signal from the external device. The first communication unit and the second communication unit transmit the output signal acquired by the signal acquisition unit to the external server. The first communication control unit uses the first communication unit to communicate with the external server when the radio field strength of the signal transmitted from the first communication unit to the external server is over a specific threshold value, and switches from communication using the first communication unit to communication using the second communication unit when the radio field strength is at or below the specific threshold value.

Here, a communication device that acquires an output signal from an external device such as a sensor and transmits it to an external server comprises a first communication unit and a second communication unit as a plurality of communication means. The radio field strength of the signal transmitted from the first communication unit to the external server is then compared with a specific threshold value, and if the strength is over this threshold value, communication is performed using the first communication unit, but if the strength is below this threshold value, control is performed so that communication goes through the second communication unit.

Here, the external device includes, for example, various devices such as various sensors and relays.

The external server includes, for example, a server device, a cloud server equipped with a storage unit, and the like.

The first communication unit and the second communication unit may communicate with the external server using a different communication method such as LTE (registered trademark; Long Term Evolution), Wi-Fi (registered trademark), LoRa (registered trademark; Long Range), etc., or communication may be performed using the same communication method.

The radio field strength can be, for example, a value of RSSI (received signal strength indicator) or RSRP (reference signal received power).

Consequently, since the communication device is provided with a plurality of communication means, the user can select whether to switch to the second communication unit for communication according to the radio field strength during communication between the first communication unit and the external server.

As a result, the output signals acquired from the external device can be stably outputted to the external server.

The communication device according to the second invention is the communication device according to the first invention, further comprising a second communication control unit that determines whether communication is possible according to whether the radio field strength of the signal transmitted from the second communication unit to the external server is over the specific threshold value.

Consequently, when the radio field strength of communication between the first communication unit and the external server is below a specific threshold value and communication is switched to the second communication unit, communication is performed using the second communication unit when the radio field strength between the second communication unit and the external server is above a specific threshold value, and it can be determined that communication is not possible when this strength is at or below the threshold value.

The communication device according to the third invention is the communication device according to the first or second invention, wherein the first communication control unit determines whether communication is possible according to whether or not a response signal is received from the external server within a specific length of time when the output signal has been transmitted to the external server.

Consequently, in addition to determining whether communication is possible using the radio field strength, it can be determined whether communication is possible according to whether or not a response signal from the external server is received within a specific length of time.

The communication device according to the fourth invention is the communication device according to the second invention, wherein the second communication control unit determines whether communication is possible according to whether or not a response signal is received from the external server within a specific length of time when the output signal has been transmitted to the external server.

Consequently, again on the second communication unit side, in addition to determining whether communication is possible using the radio field strength, it can be determined whether communication is possible according to whether or not a response signal from the external server is received within a specific length of time.

The communication device according to the fifth invention is the communication device according to the first or second invention, wherein the first communication control unit uses RSSI (received signal strength indicator) or RSRP (reference signal received power) data as data for determination using radio field strength.

Consequently, it can be determined whether or not communication is possible using the radio field strength by acquiring the radio field strength (the above-mentioned RSSI, RSRP, etc.) from an antenna provided on the first communication unit side, for example.

The communication device according to the sixth invention is the communication device according to the first or second invention, wherein the first communication unit communicates with the external server by a first communication method, and the second communication unit communicates with the external server by a second communication method that is different from the first communication method.

Consequently, if communication with the external server is performed by a different communication method such as LTE (registered trademark; Long Term Evolution), Wi-Fi (registered trademark), LoRa (registered trademark; Long Range), etc., then communication can be ensured using the communication method of the second communication unit even if a communication failure occurs in the communication method of the first communication unit.

The communication device according to the seventh invention is the communication device according to the first or second invention, wherein the first communication unit further comprises a first storage unit that stores the output signal acquired by the signal acquisition unit.

Consequently, if the data for the output signal acquired from the external device by the signal acquisition unit is stored in the first storage unit in the first communication unit, that data can be retrieved when communicating with the external server.

The communication device according to the eighth invention is the communication device according to the seventh invention, wherein the first storage unit stores the radio field strength of the signal transmitted from the first communication unit to the external server.

Consequently, log data for the radio field strength indicating the communication environment stored in the first storage unit can be used to determine whether communication is possible between the first communication unit and the external server.

The communication device according to the ninth invention is the communication device according to the first or second invention, wherein the second communication unit further comprises a second storage unit that stores the radio field strength of the signal transmitted from the second communication unit to the external server.

Consequently, log data for the radio field strength indicating the communication environment stored in the second storage unit can be used to determine whether communication is possible between the second communication unit and the external server.

The communication device according to the tenth invention is the communication device according to the first or second invention, wherein the external device includes a weather sensor that acquires weather data, a power monitoring sensor that acquires power information, or an agricultural sensor that acquires information from equipment used in agricultural cultivation.

Consequently, the various sensors described above can be used as an external device, allowing various kinds of data acquired from various sensors to be stably transmitted to the external server.

The communication system according to the eleventh invention comprises the communication device according to the first or second invention; an external device that transmits an output signal to the communication device; and an external server that receives the output signal transmitted via the communication device.

Consequently, the communication device described above can be used to construct a system with which an output signal acquired from an external device can be stably outputted to an external server.

The communication method according to the twelfth invention is a communication method that makes use of a communication device comprising a plurality of communication units that transmit output signals acquired from an external device to an external server, the communication method comprising a signal acquisition step, a communication step, and a determination step. In the signal acquisition step, a signal acquisition unit of the communication device acquires an output signal from the external device. In the communication step, a first communication unit of the communication device transmits the output signal acquired in the signal acquisition step to the external server. In the determination step, the first communication control unit of the communication device uses the first communication unit to communicate with the external server when the radio field strength of the signal transmitted from the first communication unit to the external server is over a specific threshold value, and switches from communication using the first communication unit to communication using the second communication unit when the radio field strength is at or below the specific threshold value.

A communication device that acquires an output signal from an external device such as a sensor and transmits it to an external server comprises a first communication unit and a second communication unit as a plurality of communication means. The radio field strength of the signal transmitted from the first communication unit to the external server is then compared with a specific threshold value, and if this strength is over the threshold value, communication is performed using the first communication unit, but if the strength is at or below the threshold value, control is performed so as to communicate via the second communication unit.

Here, the external device include, for example, various devices such as various sensors and relays.

The external server includes, for example, a cloud server equipped with a storage unit, a server device, and the like.

The first communication unit and the second communication unit may communicate with the external server using a different communication method such as LTE (registered trademark; Long Term Evolution), Wi-Fi (registered trademark), LoRa (registered trademark; Long Range), etc., or communication may be performed using the same communication method.

The radio field strength can be, for example, a value of RSSI (received signal strength indicator) or RSRP (reference signal received power).

Consequently, since the communication device is provided with a plurality of communication means, the user can select whether to switch to the second communication unit for communication according to the radio field strength during communication between the first communication unit and the external server.

As a result, the output signal acquired from the external device can be stably outputted to the external server.

The communication program according to the thirteenth invention is a communication program that is executed by a communication device comprising a plurality of communication units that transmit output signals acquired from an external device to an external server, the communication program causing a computer to execute a communication method comprising a signal acquisition step, a communication step, and a determination step. In the signal acquisition step, a signal acquisition unit of the communication device acquires an output signal from the external device. In the communication step, a first communication unit of the communication device transmits the output signal acquired in the signal acquisition step to the external server. In the determination step, the first communication control unit of the communication device uses the first communication unit to communicate with the external server when the radio field strength of the signal transmitted from the first communication unit to the external server is over a specific threshold value, and switches from communication using the first communication unit to communication using the second communication unit when the radio field strength is at or below the specific threshold value.

A communication device that acquires an output signal from an external device such as a sensor and transmits it to an external server comprises a first communication unit and a second communication unit as a plurality of communication means. The radio field strength of the signal transmitted from the first communication unit to the external server is then compared with a specific threshold value, and if this strength is over the threshold value, communication is performed using the first communication unit, but if the strength is at or below the threshold value, control is performed so as to communicate via the second communication unit.

Here, the external device includes, for example, various devices such as various sensors and relays.

The external server includes, for example, a cloud server equipped with a storage unit, a server device, and the like.

The first communication unit and the second communication unit may communicate with the external server using a different communication method such as LTE (registered trademark; Long Term Evolution), Wi-Fi (registered trademark), LoRa (registered trademark; Long Range), etc., or communication may be performed using the same communication method.

The radio field strength can be, for example, a value of RSSI (received signal strength indicator) or RSRP (reference signal received power).

Consequently, since the communication device is provided with a plurality of communication means, the user can select whether to switch to the second communication unit for communication according to the radio field strength during communication between the first communication unit and the external server.

As a result, the output signal acquired from the external device can be stably outputted to the external server.

Effects

With the communication device according to the present invention, an output signal acquired from an external device can be stably outputted to an external server.

BRIEF DESCRIPTION OF THE DRAWINGS

FIG. 2 is a diagram illustrating types of radio field strength used for determination in the communication device in FIG. 1;

FIG. 3 is a diagram showing sensor log data stored in a storage unit of a first communication unit included in the communication device in FIG. 1;

FIG. 4 is a diagram showing communication environment data stored in the storage unit of the first communication unit included in the communication device in FIG. 1;

FIG. 5 is a diagram showing threshold value data used for communication environment determination and stored in the storage unit of the first communication unit included in the communication device in FIG. 1;

DETAILED DESCRIPTION OF THE
EMBODIMENT

A communication system 1 equipped with a communication device 10 according to an embodiment of the present invention will now be described through reference to FIGS. 1 to 7.

In this embodiment, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

Also, the applicant has provided the appended drawings and the following description so that a person skilled in the art might fully understand this disclosure, but does not intend for these to limit what is discussed in the patent claims.

(1) Configuration of Communication System 1

Figure 1:
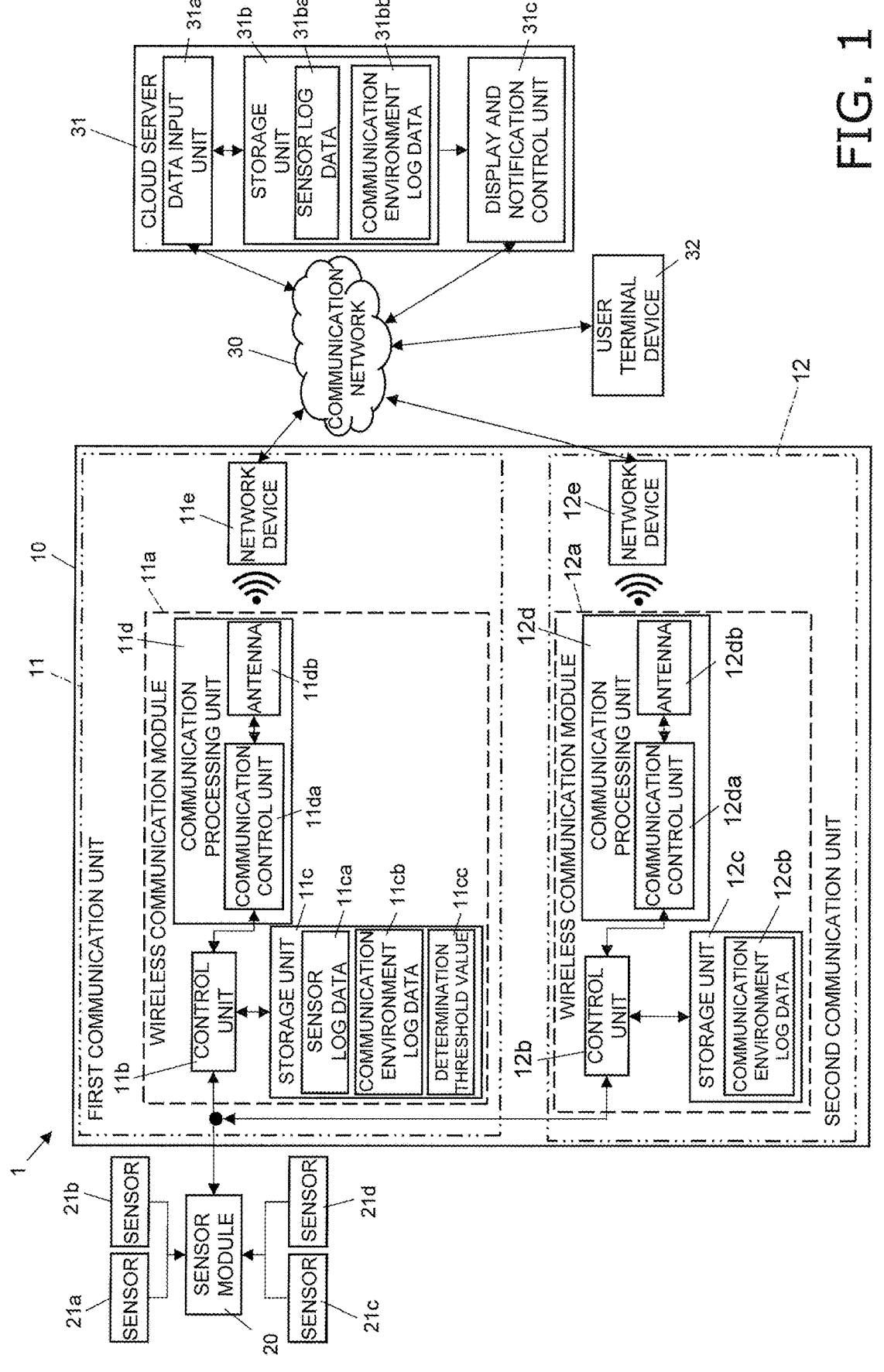
FIG. 1 is a block diagram showing the configuration of a communication system including the communication device according to an embodiment of the present invention.

As shown in FIG. 1, the communication system 1 according to this embodiment is configured around a communication device 10 that acquires various kinds of data (output signals) sensed by a plurality of sensors (external devices) 21a to 21d via a sensor module 20, and transmits this data to a cloud server 31 via a communication network 30. That is, the communication system 1 comprises the communication device 10, the sensor module 20 and sensors 21a to 21d, the communication network 30, the cloud server (external server) 31, and a user terminal device 32.

As shown in FIG. 1, the communication device 10 acquires various kinds of data sensed by the sensors 21a to 21d via the sensor module 20, uses the radio field strength to determine the communication environment, and selects which communication means, either a first communication unit 11 or a second communication unit 12, to use to communicate with the cloud server 31.

The detailed configuration of the communication device 10 will be described below.

Here, as to the radio field strength indicating the communication environment between the first communication unit 11 and the cloud server 31 included in the communication device 10, or the communication environment between the second communication unit 12 and the cloud server 31, the measured value for RSSI (received signal strength indicator) or RSRP (reference signal received power) can be used as shown in FIG. 2, for example, as the value of the radio field strength acquired from an antenna 11db of the first communication unit 11 or an antenna 12db of the second communication unit 12.

As shown in FIG. 2, RSSI (received signal strength indicator) is a value given in units of dBm (decibel milliwatts), and is expressed as a power measurement value of a signal (the entire system band) from an access point (base station) or a router. The larger the RSSI value is in the positive direction, the stronger a radio wave is judged to be. For example, −30 dBm or more is determined to be "extremely strong," −67 dBm or more is "very strong," −70 dBm or more is "strong," and −80 dBm or more is "weak."

As shown in FIG. 2, RSRP (reference signal received power) is a value given in units of dBm (decibel milliwatts), and is expressed as a received power value of a reference signal determined by the positional relation between a terminal and a base station. For example, just as with RSSI, the larger the RSRP value is in the positive direction, the stronger a radio wave is judged to be. For example, −44 dBm or more is determined to be "extremely strong," −90 dBm or more is "very strong," −100 dBm or more is "strong," and −120 dBm or more is "very weak."

The sensor module 20 is connected to the sensors 21a to 21d, and transmits various kinds of data sensed by the sensors 21a to 21d to the communication device 10.

The sensors 21a to 21d include, for example, a weather sensor that acquires weather data (barometric pressure, temperature, humidity, etc.), a power monitoring sensor that acquires power information in homes, offices, or the like, and an agricultural sensor that acquires information from equipment used to grow crops (sunshine hours, temperature, humidity, acceleration, etc.).

The communication network 30 connects the communication device 10 and the cloud server 31, and enables wireless communication between the communication device 10 and the cloud server 31.

The cloud server 31 is a virtual server device provided in a cloud space on the Internet, and stores various kinds of data transmitted via the communication device 10. As shown in FIG. 1, the cloud server 31 has a data input unit 31a, a storage unit 31b, and a display and notification control unit 31c.

The data input unit 31a receives the input of various kinds of data transmitted from the communication device 10 via the communication network 30.

As shown in FIG. 1, the storage unit 31b stores various kinds of data sensed by the sensors 21a to 21d as sensor log data 31ba, and also stores communication environment log data 31bb indicating the communication environment with the communication device 10 as a value of radio field strength.

The display and notification control unit 31c displays the sensor log data 31ba and the communication environment log data 31bb on the user terminal device 32 via the communication network 30, and notifies the user of the communication environment between the communication device 10 and the cloud server 31, etc.

The user terminal device 32 is a terminal owned by an administrator who manages various kinds of data sensed by the sensors 21a to 21d, and is connected to the cloud server 31 via the communication network 30. The user terminal device 32 displays information about the determination result (communication environment, etc.) obtained using the radio field strength in the communication device 10 (discussed below).

(2) Configuration of Communication Device 10

The communication device 10 according to this embodiment is a device that transmits sensing results acquired by the sensors 21a to 21d via the sensor module 20 to the cloud server 31, and comprises the communication unit 11 and the second communication unit 12 as a plurality of communication means that are used selectively, as shown in FIG. 1.

(2-1) Configuration of First Communication Unit 11

The first communication unit 11 is one of a plurality of communication means included in the communication device 10, and makes use of LTE (registered trademark; Long Term Evolution), Wi-Fi (registered trademark), LoRa (registered trademark), (BLE (registered trademark; Bluetooth (registered trademark) Low Energy), or another such communication method. As shown in FIG. 1, the communication unit 11 has a wireless communication module 11a and a network device 11e.

As shown in FIG. 1, the wireless communication module 11a includes a control unit (signal acquisition section) 11b, a storage unit 11c, and a communication processing unit 11d.

The control unit (signal acquisition unit) 11b is connected to the sensor module 20, as shown in FIG. 1, and acquires the sensing results (output signals) from the sensors 21a to 21d via the sensor module 20. Also, the control unit 11b causes the storage unit 11c to store the acquired sensing results as sensor log data 11ca. Furthermore, the control unit 11b is connected to the communication processing unit 11d, acquires data about radio field strength (discussed below), and stores this data in the storage unit 11c as communication environment log data 11cb.

As shown in FIG. 1, the storage unit 11c stores sensor log data 11ca, communication environment log data 11cb, and determination threshold values 11cc.

The sensor log data 11ca is various kinds of data sensed by the sensors 21a to 21d, and includes, for example, the sensing time of the sensors 21a to 21d, the types of the sensors 21a to 21d (temperature, humidity, atmospheric pressure, etc.), the IDs ("1" or "2") of the first communication unit 11 and second communication unit 12, and sensor data (20.0° C., 1011 hPa, etc.), as shown in FIG. 3.

The communication environment log data 11cb is data about radio field strength acquired from the antenna 11db of the first communication unit 11, and as shown in FIG. 4, the date and time of acquisition of radio wave strength, data about radio wave strength (RSSI value, RSRP value) acquired every hour, and so forth are recorded.

The determination threshold value 11*cc* is a threshold value used in communication environment determination processing using radio field strength (discussed below), and as shown in FIG. 5, includes the communication method (LTE, LoRa, Wifi, BLE, etc.) employed by the first communication unit 11 or the second communication unit 12, threshold value setting categories (RSRP, timeout duration), and the values of the threshold value setting categories (dBm, seconds).

For example, when the first communication unit 11 or the second communication unit 12 employs LTE-Cat1 or LTE-CatM1 as the communication method, the radio field strength threshold (RSRP) is −120 dBm, and the timeout duration threshold value is set to 150 seconds.

Also, when the first communication unit 11 or the second communication unit 12 employs LoRa as the communication method, the radio field strength threshold value (RSSI) is set to −90 dB, and the timeout duration threshold value is set to 60 seconds.

Furthermore, when the first communication unit 11 or the second communication unit 12 uses Wifi or BLE as the communication method, the radio field strength threshold value (RSSI) is −90 dBm, and the timeout duration threshold value is set to 60 seconds.

The communication processing unit 11*d* transmits the sensing results of the sensors 21*a* to 21*d* acquired by the control unit 11*b* to the cloud server 31 via the network device 11*e* and the communication network 30. As shown in FIG. 1, the communication processing unit 11*d* includes a communication control unit (first communication control unit) 11*da* and the antenna 11*db*.

The communication control unit (first communication control unit) 11*da* controls communication between the communication device 10 and the cloud server 31 via the communication network 30. More specifically, if the radio field strength of the signal transmitted from the antenna 11*db* of the first communication unit 11 to the cloud server 31 is over a specific threshold value, the first communication unit 11 is used to perform communication with the cloud server 31. On the other hand, if the radio field strength is at or below this specific threshold value, the communication control unit 11*da* switches from communication using the first communication unit 11 to communication using the second communication unit 12.

Also, when the sensing results (output signals) from the sensors 21*a* to 21*d* are transmitted to the cloud server 31, the communication control unit 11*da* determines whether or not communication is possible depending on whether or not a response signal is received from the cloud server 31 within a specific length of time.

Here, the communication control unit 11*da* uses RSSI (received signal strength indicator) or RSRP (reference signal received power) data is as data for determination using radio field strength.

The antenna 11*db* transmits data such as sensing results from the sensors 21*a* to 21*d* to the network device 11*e*. Also, the antenna 11*db* measures the radio field strength (RSSI value, RSRP value, etc.) as the strength of the signal being received by the antenna 11*db*.

The network device 11*e* is connected to the communication network 30, and transmits various kinds of data received from the wireless communication module 11*a* to the cloud server 31 via the communication network 30.

(2-2) Configuration of Second Communication Unit 12

The second communication unit 12 is one of a plurality of communication means included in the communication device 10, and is, for example, LTE (registered trademark; Long Term Evolution), Wi-Fi (registered trademark), LoRa (registered trademark), (BLE (registered trademark; Bluetooth (registered trademark) Low Energy), or another such communication method. As shown in FIG. 1, the second communication unit 12 has a wireless communication module 12*a* and a network device 12*e*.

As shown in FIG. 1, the wireless communication module 12*a* includes a control unit (signal acquisition unit) 12*b*, a storage unit 12*c*, and a communication processing unit 12*d*.

The control unit (signal acquisition unit) 12*b* is connected to the sensor module 20 and the control unit 11*b* of the first communication unit 11, as shown in FIG. 1, and acquires the sensing results (output signals) of the sensors 21*a* to 21*d* from the storage unit 11*c* of the communication unit 11 when the radio field strength is low at the first communication unit 11. Also, the control unit 12*b* is connected to the communication processing unit 12*d*, acquires data about the radio field strength of the signal transmitted from the second communication unit 12, and stores this data in the storage unit 12*c* as communication environment log data 12*cb*.

As shown in FIG. 1, the storage unit 12*c* stores the communication environment log data 12*cb*.

The communication environment log data 12*cb* is data about the radio field strength acquired from the antenna 12*db* of the second communication unit 12, and as shown in FIG. 4, the date and time the radio field strength was acquired, the RSSI value, the RSRP value, and so forth are recorded.

The storage unit 12*c* of the second communication unit 12 does not store the sensor log data 11*ca* or data for the determination threshold value 11*cc*, which are stored in the storage unit 11*c* of the first communication unit 11.

Consequently, when it is selected to communicate using the second communication unit 12, the necessary sensor log data 11*ca* is retrieved from the storage unit 11*c* of the first communication unit 11 and transmitted, which means that the storage capacity of the storage unit 12*c* of the second communication unit 12 can be reduced.

The communication processing unit 12*d* transmits the sensing results of the sensors 21*a* to 21*d* acquired by the control unit 12*b* to the cloud server 31 via the network device 12*e* and the communication network 30. As shown in FIG. 1, the communication processing unit 12*d* has a communication control unit (second communication control unit) 12*da* and the antenna 12*db*.

The communication control unit (second communication control unit) 12*da* controls communication between the communication device 10 and the cloud server 31 via the communication network 30. More specifically, the communication control unit 12*da* uses the second communication unit 12 to perform communication with the cloud server 31 if the radio field strength of the signal transmitted from the antenna 12*db* of the second communication unit 12 to the cloud server 31 is over a specific threshold value. On the other hand, if the radio field strength is at or below the specific threshold value, the communication control unit 12*da* transmits a warning to the communication network 30, via the cloud server 31, indicating that communication is impossible with both the first communication unit 11 and the second communication unit 12.

Consequently, in the communication device 10 comprising the first communication unit 11 and the second communication unit 12 as a plurality of communication means, if the radio field strength of both the first communication unit 11 and the second communication unit 12 is below the threshold value, then when a communication failure such as a communication interruption is resolved and communication is once again possible, the user (user terminal device 32) can be notified that the communication environment of the communication device 10 has deteriorated and communication is not possible.

Also, when the sensing results (output signals) of the sensors 21a to 21d are transmitted to the cloud server 31, the communication control unit 12da determines whether or not communication is possible depending on whether or not a response signal is received from the cloud server 31 within a specific length of time.

Just as with the communication control unit 11da of the first communication unit 11, the communication control unit 12da uses RSSI (received signal strength indicator) or RSRP (reference signal received power) data as data for determination using radio field strength.

The antenna 12db transmits to the network device 12e data such as sensing results of the sensors 21a to 21d. Also, the antenna 12db measures the radio field strength (RSSI value, RSRP value, etc.) as the strength of the signal being received by the antenna 12db.

The network device 12e is connected to the communication network 30, and transmits various kinds of data received from the wireless communication module 12a to the cloud server 31 via the communication network 30.

Communication Processing by Communication Device 10

Figure 6:
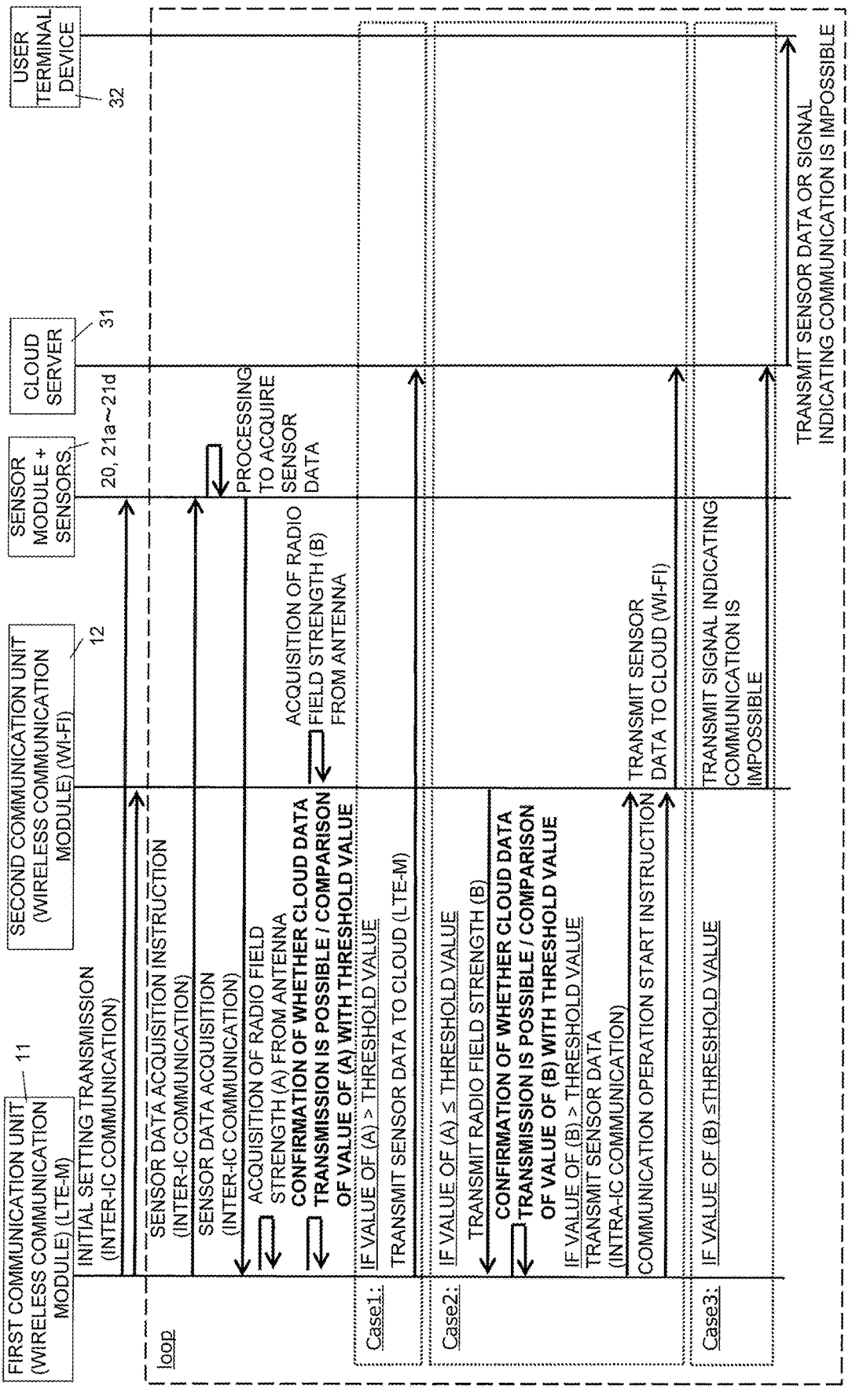
FIG. 6 is a diagram showing the entire sequence of processing in the communication system in FIG. 1.

As shown in FIG. 6, the communication system 1 of this embodiment performs communication determination processing between the communication device 10 (first communication unit 11, second communication unit 12), the sensor module 20 and sensors 21a to 21d, the cloud server 31, and the user terminal device 32.

That is, the communication device 10 first transmits initial settings from the first communication unit 11 to the second communication unit 12 and the sensor module 20.

The first communication unit 11 then transmits a sensor data acquisition instruction signal to the sensor module 20.

In response to receiving the sensor data acquisition instruction signal from the first communication unit 11, the sensor module 20 transmits the sensing results of the sensors 21a to 21d as sensor data (output signals) to the first communication unit 11. This allows the first communication unit 11 to acquire sensor data and store it in the storage unit 11c.

The first communication unit 11 then has the communication control unit 11da in the communication processing unit 11d acquire data (A) related to the radio field strength from the antenna 11db.

At this point, substantially simultaneously with the first communication unit 11, the second communication unit 12 has the communication control unit 12da in the communication processing unit 12d acquire data (B) related to the radio field strength from the antenna 12db.

As discussed above, the data related to the radio field strength acquired by the first communication unit 11 and the second communication unit 12 is, for example, RSSI (received signal strength indicator) or RSRP (reference signal received power) data.

The communication control unit 11da of the first communication unit 11 then compares the radio field strength data (A) acquired from the antenna 11db with a threshold value for determining the communication environment, which has been stored in advance in the storage unit 11c, and if the value of (A) is over the threshold value (case 1), the sensor data is directly transmitted from the first communication unit 11 to the cloud server 31.

On the other hand, if the value of (A) is at or below the threshold value (case 2), the control unit 11b of the first communication unit 11 acquires from the control unit 12b of the second communication unit 12 data (B) related to the radio field strength obtained from the antenna 12db of the second communication unit 12.

Then, the communication control unit 11da determines whether it is possible to switch from the first communication unit 11 to the second communication unit 12 as the transmission means. More specifically, the communication control unit 12da of the second communication unit 12 compares the radio field strength (B) acquired from the antenna 12db with the threshold value, and if the value of (B) is over the threshold value, the communication control unit 12da of the first communication unit 11 transmits to the second communication unit 12 the sensor data retrieved from the storage unit 11c by the control unit 11b, and a communication operation start instruction signal.

Consequently, the second communication unit 12 can transmit sensor data from the second communication unit 12 to the cloud server 31 by a communication method (such as Wi-Fi) that is different from that of the first communication unit 11 (such as LTE) in a communication environment in which sufficient radio field strength cannot be obtained at the first communication unit 11.

Also, if the value of (A) in the first communication unit 11 is at or below the threshold value, and the value of the radio field strength (B) of the second communication unit 12 is also at or below the threshold value (case 3), the second communication unit 12 transmits to the cloud server 31 a signal indicating that communication is not possible.

In case 1 or 2 above, the cloud server 31 transmits sensor data to the user terminal device 32. On the other hand, in case 3, in case 3 above, even if the communication device 10 is equipped with a plurality of communication means, the communication environment is such that sufficient radio field strength still cannot be obtained, so the cloud server 31 transmits a signal to the user terminal device 32 indicating that communication is impossible.

This allows the user who owns the user terminal device 32 to recognize that the communication environment of the communication device 10 has deteriorated.

Communication Method Using Communication Device 10

Figure 7:
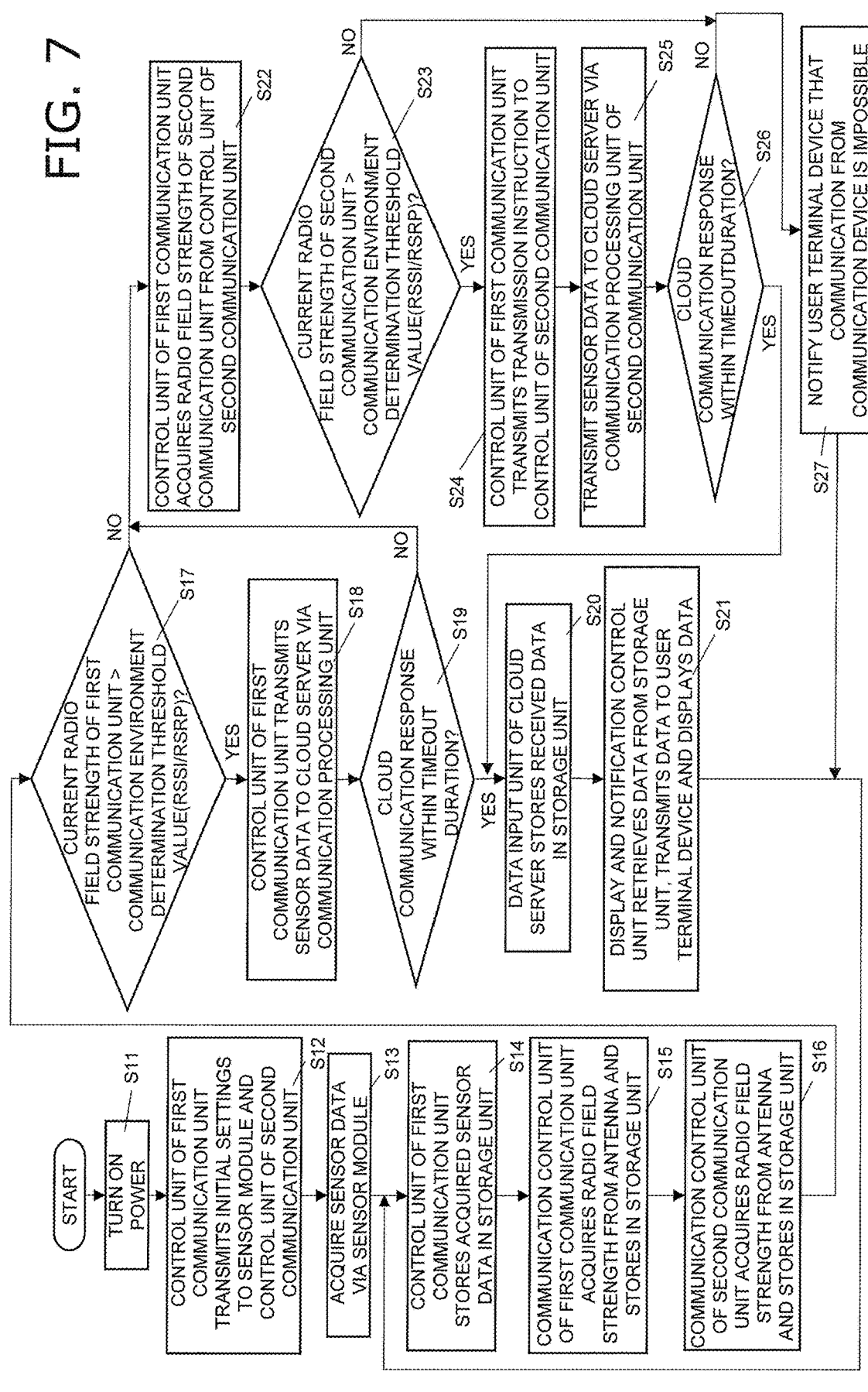
FIG. 7 is a flowchart showing the flow of processing in a communication method performed by the communication device in FIG. 1.

The communication method used by the communication device 10 in this embodiment will now be described using the flowchart of FIG. 7.

In step S11, the power to the communication device 10 is turned on.

Next, in step S12, the control unit 11b of the first communication unit 11 transmits initial settings to the control unit 12b of the second communication unit 12.

Next, in step S13, the control unit 11b of the first communication unit 11 acquires the sensing results of the sensors 21a to 21d via the sensor module 20.

Next, in step S14, the control unit 11b of the first communication unit 11 stores the acquired sensor data in the storage unit 11c.

Next, in step S15, the communication control unit 11da of the first communication unit 11 acquires the radio field strength from the antenna 11db and stores it in the storage unit 11c as communication environment log data.

Next, in step S16, the communication control unit 12da of the second communication unit 12 uses the antenna 12db to acquire the radio field strength, and stores this in the storage unit 12c as communication environment log data.

Next, in step S17, the current radio field strength of the first communication unit 11 acquired in step S15 is compared with a communication environment determination threshold value (RSSI/RSRP), and if this strength is over the threshold value, the processing proceeds to step S18. On the other hand, if the current radio field strength of the first communication unit 11 is at or below the threshold value, communication using the first communication unit 11 is halted and the processing proceeds to step S22.

Next, in step S18, the control unit 11b of the first communication unit 11 transmits the sensor data to the cloud server 31 via the communication processing unit 11d.

Next, in step S19, after the sensor data has been transmitted from the first communication unit 11, it is determined whether or not there has been a response from the cloud server 31 within the determination threshold value (timeout duration) stored in the storage unit 11c.

Here, if the first communication unit 11 has received a response signal from the cloud server 31 within a specific timeout duration, the processing proceeds to step S20. On the other hand, if the first communication unit 11 has been unable to receive a response signal from the cloud server 31 within the specific timeout duration, the communication environment between the first communication unit 11 and the cloud server 31 is assumed to have deteriorated in some way, so the processing proceeds to step S22 in order to use another communication means (the second communication unit 12).

Next, in step S20, since it was determined in step S19 that there was a response from the cloud server 31 within the timeout duration, the data input unit 31a of the cloud server 31 stores the sensor data received from the first communication unit 11 in the storage unit 31b.

Next, in step S21, the display and notification control unit 31c of the cloud server 31 retrieves the sensor data from the storage unit 31b, transmits the sensor data to the user terminal device 32 via the communication network 30, and displays the sensor data.

Next, in step S22, since it was determined in step S17 that the radio field strength of the first communication unit 11 was below the threshold value, or in step S19 that there had been no response from the cloud server 31 within the timeout duration, communication using the first communication unit 11 is determined to be impossible, and the control unit 11b of the first communication unit 11 acquires the radio field strength of the second communication unit 12 from the control unit 12b of the second communication unit 12.

Next, in step S23, the current radio field strength of the second communication unit 12 acquired in step S16 is compared with a communication environment determination threshold value (RSSI/RSRP), and if it is over the threshold value, the processing proceeds to step S24. On the other hand, if the current radio field strength of the second communication unit 12 is at or below the threshold value, communication using the second communication unit 12 is halted and the processing proceeds to step S27.

Next, in step S24, since it was determined in step S23 that the radio field strength from the second communication unit 12 was sufficiently high, the control unit 11b of the first communication unit 11 transmits a transmission instruction signal from the second communication unit 12 to the control unit 12b of the second communication unit 12, and retrieves the sensor data stored in the storage unit 11c and transmits it to the control unit 12b of the second communication unit 12.

Next, in step S25, the communication processing unit 12d of the second communication unit 12 that has received the transmission instruction signal from the first communication unit 11 transmits the sensor data to the cloud server 31 via the communication network 30.

Next, in step S26, after the sensor data has been transmitted from the second communication unit 12, it is determined whether or not there has been a response from the cloud server 31 within the determination threshold value (timeout duration) stored in the storage unit 11c.

Here, if the second communication unit 12 has received a response signal from the cloud server 31 within the specific timeout duration, the processing returns to step S20 and the subsequent processing is repeated. On the other hand, if the second communication unit 12 was unable to receive a response signal from the cloud server 31 within the specific timeout duration, the communication environment between the second communication unit 12 and the cloud server 31 is assumed to have deteriorated in some way, so it is determined that communication from the communication device 10 is not possible, and the processing proceeds to step S27.

Next, in step S27, since it was determined in step S23 that the radio field strength of the second communication unit 12 was at or below the threshold value, or in step S26 that there was no response from the cloud server 31 within the timeout duration, a message or the like indicating that transmission of sensor data from the communication device 10 to the cloud server 31 is not possible is transmitted to the user terminal device 32.

Other Embodiments

An embodiment of the present invention was described above, but the present invention is not limited to or by the above embodiment, and various changes are possible without departing from the gist of the invention.

(A)

The above embodiment was described by giving examples in which the present invention was realized as a communication device and a communication method. However, the present invention is not limited to this.

For example, the present invention may be realized as a communication program that causes a computer to execute a communication method using the communication device described above.

This program is stored in a memory (storage unit) installed in a communication device, and the CPU reads the communication program stored in the memory and causes the hardware to execute the various steps. More specifically, the same effect as described above can be obtained by having a CPU read a communication program and execute the above-mentioned signal acquisition step, communication step, and determination step.

Also, the present invention may be realized as a recording medium that stores a communication program.

(B)

In the embodiment described above, an example was given in which the first communication unit 11 and the second communication unit 12 performed communication with the cloud server 31 using different communication paths and different communication methods. However, the present invention is not limited to this.

For example, the first communication unit and the second communication unit may be configured to perform communication using the same communication method through different communication paths.

(C)

In the above embodiment, an example was given in which determination processing was performed such that the communication control unit 11da provided to the first communication unit 11 acquired the radio field strength in the first communication unit 11 and compared it with a threshold value, and also acquired the radio field strength in the second communication unit 12 and compared it with a threshold value. However, the present invention is not limited to this.

For example, the determination processing to compare the radio field strength and a threshold value may be performed by a single communication control unit that collectively controls a plurality of communication means.

In this case, communication by all communication units can be controlled by a single overall communication control unit, without having to provide a communication control unit for each communication unit.

(D)

In the above embodiment, an example was given in which only communication environment data was stored in the storage unit 12c on the second communication unit 12 side, and sensor log data and communication environment determination threshold value data were stored only in the storage unit 11c on the first communication unit 11 side. However, the present invention is not limited to this.

For example, the configuration may be such that sensor log data, communication environment determination threshold value data, etc., are also stored on the second communication unit side, just as on the first communication unit side.

(E)

In the above embodiment, an example was given in which RSSI (received signal strength indicator) or RSRP (reference signal received power) was used as determination data using radio field strength. However, the present invention is not limited to this.

For example, other judgment data that may be used include RSRQ (reference signal received quality), SINR (signal to interference plus noise ratio), etc.

(F)

In the above embodiment, an example was given in which the communication device 10 comprised two communication means (the first communication unit 11 and the second communication unit 12) using different communication methods. However, the present invention is not limited to this.

For example, the configuration may be such that the communication device comprises three or more communication units with different communication methods and/or communication routes.

(G)

In the above embodiment, an example was given in which various kinds of data (output signals) sensed by the four sensors 21a to 21d were transmitted to the communication device 10 via the sensor module 20. However, the present invention is not limited to this.

For example, output signals transmitted to the communication device may be transmitted from one, two, or three external devices (sensors, etc.), or may be transmitted from five or more external devices.

(H)

In the embodiment described above, the communication device 10 that acquired output signals from various kinds of sensor, such as a weather sensor, a power monitoring sensor, or an agricultural sensor, was used as an example of an external device. However, the present invention is not limited to this.

For example, this device may be a communication device that acquires a power cutoff signal from an external device such as a relay, and transmits it to an external server.

INDUSTRIAL APPLICABILITY

The communication device of the present invention exhibits the effect that an output signal acquired from an external device can be stably outputted to an external server, and therefore can be broadly applied as a variety of communication devices.

REFERENCE SIGNS LIST

1 communication system
10 communication device
11 first communication unit
11a wireless communication module
11b control unit (signal acquisition unit)
11c storage unit (first storage unit)
11ca sensor log data
11cb communication environment log data
11cc determination threshold value
11d communication processing unit
11da communication control unit (first communication control unit)
11db antenna
11e network device
12 second communication unit
12a wireless communication module
12b control unit
12c storage unit (second storage unit)
12cb communication environment log data
12d communication processing unit
12da communication control unit (second communication control unit)
12db antenna
12e network device
20 sensor module
21a to 21d sensors (external devices)
30 communication network
31 cloud server (external server)
31a data input unit
31b storage unit
31ba sensor log data
31bb communication environment log data
31c display and notification control unit
32 user terminal device

The invention claimed is:

1. A communication device that acquires an output signal from an external device and transmits it to an external server, the communication device comprising:

a first communication unit comprising a first antenna;

a second communication unit comprising a second antenna;

a processor configured with a program to perform operations comprising:

acquiring an output signal from the external device; and operation as a first communication control unit configured to use the first communication unit to communicate with the external server to transmit the output signal to the external server when a radio field strength of the signal transmitted from the first communication unit to the external server is over a specific threshold value, and switch a subject of the communication from communication using the first communication unit to communication using the second communication unit to transmit the output signal to the external server when the radio field strength is at or below the specific threshold value.

2. The communication device according to claim 1, wherein the processor is configured with the program to perform operations further comprising operation as a second communication control unit configured to determine whether communication is possible according to whether the radio field strength of the signal transmitted from the second communication unit to the external server is over the specific threshold value.

3. The communication device according to claim 2, wherein the processor is configured with the program to perform operations such that operation as the second communication control unit determines whether communication is possible according to whether or not a response signal is received from the external server within a specific length of time when the output signal has been transmitted to the external server.

4. The communication device according to claim 1, wherein the processor is configured with the program to perform operations such that operation as the first communication control unit determines whether communication is possible according to whether or not a response signal is received from the external server within a specific length of time when the output signal has been transmitted to the external server.

5. The communication device according to claim 1, wherein the processor is configured with the program to perform operations such that operation as the first communication control unit uses RSSI (received signal strength indicator) or RSRP (reference signal received power) data as data for determination using radio field strength.

6. The communication device according to claim 1, wherein the first communication unit comprising the first antenna is configured to communicate with the external server by a first communication method, and the second communication unit comprising the second antenna is configured to communicate with the external server by a second communication method that is different from the first communication method.

7. The communication device according to claim 1, further comprising a first storage that stores the output signal acquired.

8. The communication device according to claim 7, wherein the first storage stores the radio field strength of the signal transmitted from the first communication unit to the external server.

9. The communication device according to claim 1, further comprising a second storage configured to store the radio field strength of the signal transmitted from the second communication unit to the external server.

10. The communication device according to claim 1, wherein the external device includes a weather sensor configured to acquire weather data, a power monitoring sensor configured to acquire power information, or an agricultural sensor configured to acquire information from equipment used in agricultural cultivation.

11. A communication system, comprising:

the communication device according to claim 1;

the external device configured to transmit the output signal to the communication device; and the external server configured to receive the output signal transmitted via the communication device.

12. A communication method that makes use of a communication device comprising first and second communication units respectively comprising first and second antennas that transmit output signals acquired from an external device to an external server, the communication method comprising:

acquiring an output signal from the external device; and using the first communication unit to communicate with the external server to transmit the output signal to the external server when a radio field strength of the signal transmitted from the first communication unit to the external server is over a specific threshold value, and switching a subject of the communication from communication using the first communication unit to communication using the second communication unit to transmit the output signal to the external server when the radio field strength is at or below the specific threshold value.

13. A communication program that is executed by a communication device comprising first and second communication units respectively comprising first and second antennas that transmit output signals acquired from an external device to an external server, the communication program causing a computer to execute a communication method comprising:

acquiring an output signal from the external device; and using the first communication unit to communicate with the external server to transmit the output signal to the external server when a radio field strength of the signal transmitted from the first communication unit to the external server is over a specific threshold value, and switching a subject of the communication from communication using the first communication unit to communication using the second communication unit to transmit the output signal to the external server when the radio field strength is at or below the specific threshold value.

* * * * *